United States Patent
Devineni et al.

(10) Patent No.: US 12,197,771 B2
(45) Date of Patent: Jan. 14, 2025

(54) UNIVERSAL FLASH STORAGE READ THROUGHPUT ENHANCEMENTS

(71) Applicant: QUALCOMM Incorporated, San Diego, CA (US)

(72) Inventors: Sravani Devineni, Hyderabad (IN); Sai Praneeth Sreeram, Anantapur (IN); Madhu Yashwanth Boenapalli, Hyderabad (IN); Surendra Paravada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 18/298,484

(22) Filed: Apr. 11, 2023

(65) Prior Publication Data

US 2024/0345762 A1   Oct. 17, 2024

(51) Int. Cl.
G06F 12/00 (2006.01)
G06F 3/06 (2006.01)

(52) U.S. Cl.
CPC .......... G06F 3/0655 (2013.01); G06F 3/0604 (2013.01); G06F 3/0679 (2013.01)

(58) Field of Classification Search
CPC .... G06F 3/0655; G06F 3/0604; G06F 3/0679; G06F 12/0238; G06F 12/10; G06F 2212/7201; G06F 2212/7203; G06F 2212/7206; G06F 2212/7207
See application file for complete search history.

(56) References Cited

U.S. PATENT DOCUMENTS

| | | | |
|---|---|---|---|
| 2020/0098423 A1 | 3/2020 | Huang et al. | |
| 2020/0401332 A1 | 12/2020 | Ravimohan et al. | |
| 2022/0188246 A1* | 6/2022 | Gyllenskog | G06F 13/1668 |
| 2022/0197509 A1* | 6/2022 | Kim | G06F 12/0246 |

FOREIGN PATENT DOCUMENTS

CN    115729439 A    3/2023

OTHER PUBLICATIONS

International Search Report and Written Opinion—PCT/US2024/018767—ISA/EPO—Jul. 17, 2024. 11 pages.

\* cited by examiner

*Primary Examiner* — Shawn X Gu
(74) *Attorney, Agent, or Firm* — Muncy, Geissler, Olds & Lowe, P.C./QUALCOMM (57) ABSTRACT

Methods that may be performed by a universal flash storage (UFS) system of a computing device for updating logical-to-physical (L2P) address mapping tables. Various embodiments may include enabling a device control mode (DCM) of host performance booster (HPB) based on a flush of a writebooster buffer to a normal storage of a UFS device of the UFS system, and updating an L2P address mapping table at a host device of the UFS system while DCM is enabled based on the flush of the writebooster buffer to the normal storage. Some embodiments may include generating a signal having an indicator of a UFS protocol information unit configured to indicate a change in an HPB mode at the UFS device based on the flush of the writebooster buffer to the normal storage, and sending the signal from the UFS device to the host device.

25 Claims, 8 Drawing Sheets

UNIVERSAL FLASH STORAGE READ THROUGHPUT ENHANCEMENTS

BACKGROUND

Developers and users of computing devices are always seeking improved operation performance. One method to improve operations of computing devices is a host performance booter (HPB) mode in which host components store and use logical-to-physical (L2P) address mapping tables for host components to access memory device components. The logical-to-physical (L2P) address mapping tables enable knowledge of whether data sought by host components is located at the memory device and whether such locations are active. Knowledge of existence of data and activity status of locations of the data at the memory device reduces input/output transaction times for accessing data by host components at the memory device, thereby improving operation performance.

SUMMARY

Various aspects include methods performed by a universal flash storage (UFS) system of a computing device for updating logical-to-physical (L2P) address mapping tables. Various aspects may include enabling a device control mode (DCM) of host performance booter (HPB) based on a flush of a writebooster buffer to a normal storage of a UFS device of the UFS system, and updating an L2P address mapping table at a host device of the UFS system while DCM is enabled based on the flush of the writebooster buffer to the normal storage.

Various aspects may further include generating a signal configured to indicate a change in an HPB mode at the UFS device based on the flush of the writebooster buffer to the normal storage, and sending the signal from the UFS device to the host device. In some aspects, the signal includes a UFS protocol information unit (UPIU). Various aspects may further include setting an indicator of the UPIU configured to indicate the change in the HPB mode at the UFS device based on the flush of the writebooster buffer to the normal storage.

In some aspects, enabling the DCM of HPB based on the flush of the writebooster buffer to the normal storage of the UFS device of the UFS system may include enabling the DCM by a UFS device controller at the UFS device. In some aspects, enabling the DCM by the UFS device controller at the UFS device may include setting an HPB control register at the UFS device configured to indicate that DCM is enabled.

Some aspects may further include sending data of an L2P address mapping table at the UFS device with DCM enabled to the host device, in which updating the L2P address mapping table at the host device of the UFS system while DCM is enabled based on the flush of the writebooster buffer to the normal storage may include updating the L2P address mapping table at the host device using the data of the L2P address mapping table.

In some aspects, enabling the DCM of HPB based on the flush of the writebooster buffer to the normal storage of the UFS device of the UFS system comprises enabling the DCM of HPB proportionally to a writebooster buffer flush rate.

Further aspects include a UFS system including a UFS device controller and a host controller configured to perform operations of any of the methods summarized above. Further aspects include a computing device including means for performing functions of any of the methods summarized above. Further aspects include a UFS device controller and a host controller for use in a computing device, the UFS device controller and the host controller each including a processor configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and computing devices for implementing the methods for updating logical-to-physical (L2P) address mapping tables of a universal flash storage (UFS) system. Various embodiments may include enabling a device control mode (DCM) of host performance booter (HPB) based on a flush of a writebooster buffer (e.g., a single-level cell (SLC) memory) to a normal storage (e.g., a triple-level cell (TLC) memory) of a UFS device of the UFS system, and updating an L2P address mapping table at a host device of the UFS system while DCM is enabled based on the flush of the writebooster buffer to the normal storage. Some embodiments may include generating a signal having an indicator of a UFS protocol information unit (UPIU) configured to indicate a change in an HPB mode at the UFS device based on the flush of the writebooster buffer to the normal storage, and sending the signal from the UFS device to the host device. Some embodiments may include sending data of an L2P address mapping table at the UFS device with DCM enabled to the host device, and updating the L2P address mapping table at the host device using the data of the updated L2P address mapping table from the UFS device with DCM enabled.

The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high speed communications and the sharing of memory and resources.

Developers and users of computing devices are always seeking improved performance. One approach for improving operation performance of computing devices is an HPB mode in which a host memory, such as a dynamic random access memory (DRAM) communicably connected to a host controller of an SoC, is used as a cache for a flash transition layer (FTL). The FTL maintains an L2P address mapping table in flash memory of an UFS device connected to the host controller. The L2P address mapping table enables knowledge of whether data sought by host components is located at the flash memory and whether such locations are active. The HPB mode enables the host memory to maintain an L2P address mapping table, which may correspond to at least part of the L2P address mapping table in the flash memory. L2P address mapping table entries at the host memory can be read by the host controller. Physical addresses from the L2P address mapping table entries stored in the host memory may be used to execute memory access transactions for the flash memory located at the UFS device faster than executing memory access transactions using logical addresses for the flash memory located on the UFS device. This requires the UFS device to translate the logical addresses to physical addresses. Improving the speed of memory access transactions may improve operation performance.

The L2P address mapping table at the host memory may need to be updated prior to being used to ensure that the L2P address mapping table at the host memory and at the flash memory are synchronized. A write operation to the flash memory of the UFS device in a UFS system goes through the writebooster buffer (e.g., a single-level cell (SLC) NAND memory) before the data is flushed to normal storage (e.g., a triple-level (TLC) NAND memory). Currently the L2P address mapping table at the host controller is updated for write operations through response UPIU to Data OUT UPIUs using addressing at the writebooster buffer. The L2P address mapping table at the host controller is not updated for a flush of data from the writebooster buffer to the normal storage. On a subsequent read request for the same data at the flash memory of the UFS device, the host controller searches for the address in the L2P address mapping table at the host controller, which will result in a cache miss as the data being sought no longer resides at the writebooster buffer address indicated in the L2P address mapping table at the host controller. The cache miss will incur resources, such as time, greater than would be incurred for a cache hit for a read request of the same data.

Various embodiments address and overcome the foregoing problems of L2P address mapping table accuracy at the host controller and cache miss costs for read requests subsequent to write operations at the flash memory of the UFS device. Various embodiments may include a UFS device controller configured to enable DCM for the UFS device and to send updated data of the L2P address mapping table of the UFS device to the host controller. The UFS device controller may enable DCM and send the updated data of the L2P address mapping table of the UFS device following flushing data from the writebooster buffer at the UFS device to the normal storage at the UFS device. The updated data of the L2P address mapping table of the UFS device may include address data for the data at the normal storage that was flushed from the writebooster buffer. The data that was flushed from the writebooster buffer to the normal storage may include data that was written to the UFS device as part of a write operation from the host controller.

The host controller may use the updated data of L2P address mapping table of the UFS device that is received to update the L2P address mapping table of the host device. The update of the L2P address mapping table of the host device may synchronize the data of the L2P address mapping tables of the host device and the UFS device. With synchronized L2P address mapping tables of the host device and the UFS device, a read request for the data written to the UFS device as part of the write operation from the host controller may trigger a look up at the L2P address mapping table of the host device and result in a cache hit for the data. The synchronized L2P address mapping tables of the host device and the UFS device enable avoiding a cache miss during the read request for the data written to the UFS device as part of the write operation.

Figure 1:
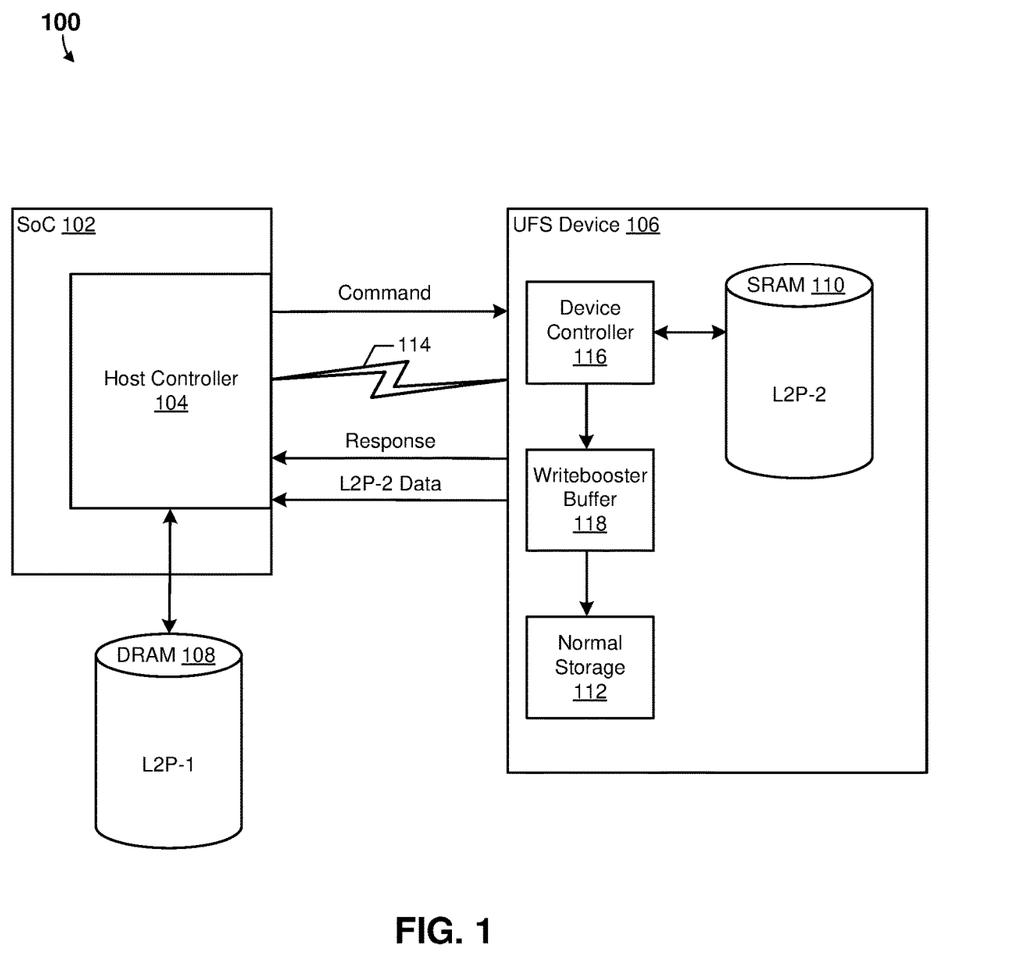
FIG. 1 is a system block diagram illustrating an example memory system suitable for implementing any of the various embodiments.

FIG. 1 is a system block diagram illustrating an example system suitable for implementing any of the various embodiments. The system 100 may include one or more computing devices or processors for performing HPB mode management. For example, the system 100 may include an SoC 102 including a host controller 104, a DRAM 108 communicably connected to the host controller 104, and a UFS device 106 communicably connected to the host controller 104 via a link 114. The host controller 104 may include a processor (not shown separately) configured to perform operations of the host controller described herein. The host controller 104 may maintain and access stored L2P mapped entries (i.e., data) of an L2P-1 address mapping table. In some embodiments, the L2P mapped entries of the L2P-1 address mapping table may be stored at the DRAM 108 or an SRAM (not shown) integral to the SoC 102, and/or the host controller 104. The UFS device 106 may include a device controller 116, a static random access memory (SRAM) 110, a writebooster buffer (e.g., SLC NAND memory) 118, and a normal storage (e.g., TLC NAND memory) 112. The device controller 116 may be coupled to the SRAM 110 and the normal storage 112, such that the device controller 116 may interface L2P mapped entries (i.e., data) of an L2P-2 address mapping table between the normal storage 112 and the SRAM 110. The writebooster buffer 118 may be coupled with the device controller 116 and the normal storage 112, such that the writebooster buffers data written from the device controller 116 to the normal storage 112.

The host controller 104 may implement write transactions to the UFS device 106. The write transactions my include the host controller 104 issuing write commands from other components of the SoC 102 and/or from components communicably connected to the SoC 102 (e.g., via I/O of the SoC) to the device controller 116. The write transactions may also include data out UPIUs transferring the write data from the host controller to the device controller 116.

The device controller 116 receiving the write commands and data out UPIUs from the host controller 104 may write the data of the data out UPIUs to the writebooster buffer 118. The device controller 116 may manage the writebooster buffer 118 storing the data, including controlling flushing the data from the writebooster buffer 118 to the normal storage 112. The device controller 116 may implement flushing the data from the writebooster buffer 118 to the normal storage 112 periodically, episodically, etc. The device controller 116 may update the L2P-2 address mapping table at the UFS device 106 with addresses at the normal storage 112 for the flushed data.

The device controller 116 may be configured to update an HPB control register (not shown separately) of the device controller 116 configured to enable HPB modes. Following flushes from the writebooster buffer 118 to the normal storage 112, the device controller 116 may update the HPB control register to enable DCM of HPB. The device controller 116 may generate and send response signals for the write transactions to the host controller 104. The response signals may include response UPUIs having indicators configured to indicate to the host controller 104 changes of HPB modes at the UFS device 106 following flushes from the writebooster buffer 118 to the normal storage 112. For example, the indicators may be configured to indicate to the host controller 104 changes enabling DCM of HPB at the UFS device 106.

Enabling DCM may enable the device controller 116 to control synchronization of the data of the L2P-1 address mapping table and the L2P-2 address mapping table. With DCM enabled, the device controller 116 may generate and send data of the L2P-2 address mapping table at the UFS device 106 to the host controller 104.

The data of the L2P-2 address mapping table at the UFS device 106 may be used by the host controller 104 to update the L2P-1 address mapping table. Updating the L2P-1 address mapping table with the data of the L2P-2 address mapping table may synchronize the data of the L2P-1 address mapping table and the L2P-2 address mapping table. For example, the host controller 104 may update addresses at the writebooster buffer for data of the write transactions at the L2P-1 address mapping table with address at the normal storage 112 from the L2P-2 address mapping table.

The host controller 104 may implement read transactions at the UFS device 106. The read transactions my include the host controller 104 issuing read requests from other components of the SoC 102 and/or from components communicably connected to the SoC 102 (e.g., via I/O of the SoC) to the device controller 116. The read transactions may also include data in UPIUs transferring the read addresses from the host controller to the device controller 116. The read addresses may be physical addresses from the L2P-1 address mapping table corresponding to logical addresses received by the host controller 104 from the other components of the SoC 102 and/or from components communicably connected to the SoC. The read transactions may be subsequent to write transactions, and the L2P-1 address mapping table may be synchronized with the L2P-2 address mapping table enabling the host controller 104 to locate at the L2P-1 address mapping table the addresses of the read data at the normal storage 112. In other words, the synchronized L2P-1 address mapping table and L2P-2 address mapping table enable cache hits for the read data, avoiding cache misses.

Figure 2:
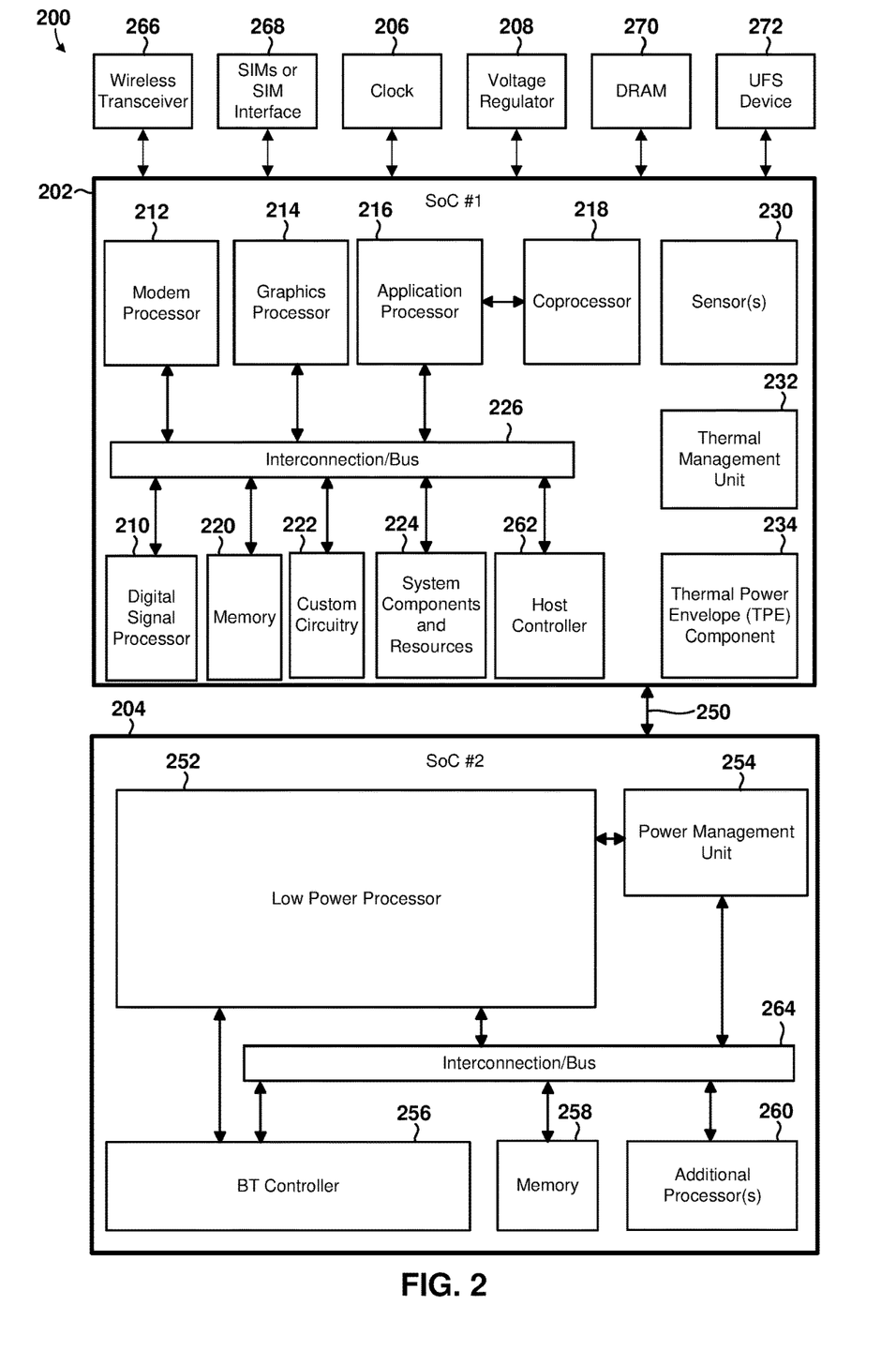
FIG. 2 is a component block diagram illustrating an example computing device suitable for implementing any of the various embodiments.

FIG. 2 is a component block diagram illustrating an example computing device 200 suitable for implementing any of the various embodiments. Various embodiments may be implemented on a number of single processor and multiprocessor computer systems, including a system-on-chip (SoC) or system in a package.

With reference to FIGS. 1 and 2, the illustrated example computing device 200 (which may be a system-in-a-package in some embodiments) includes a two SoCs 202, 204 (e.g., SoC 102) coupled to a clock 206, a voltage regulator 208, at least one subscriber identity module (SIM) 268 and/or a SIM interface, a DRAM 270 (e.g., DRAM 108) having a stored L2P address mapping table (e.g., L2P-1), a UFS device 270 (e.g., UFS device 106) having a stored L2P address mapping table (e.g., L2P-2), a wireless transceiver 266 configured to send and receive wireless communications via an antenna (not shown) to/from wireless computing devices, such as a base station, wireless device, and/or computing device (e.g., system 100). In some embodiments, the first SoC 202 may operate as central processing unit (CPU) of the computing device 200 that carries out the instructions of software application programs by performing the arithmetic, logical, control and input/output (I/O) operations specified by the instructions. In some embodiments, the second SoC 204 may operate as a specialized processing unit. For example, the second SoC 204 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, a host controller 262 (e.g., host controller 104), an interconnection/bus module 226, one or more sensors 230 (e.g., accelerometer, temperature sensor, pressure sensor, optical sensor, infrared sensor, analog sound sensor, etc.), a thermal management unit 232, and a thermal power envelope (TPE) component 234. The second SoC 204 may include a low power processor 252, a power management unit 254, an interconnection/bus module 264, a BT controller 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SoC 202, 204 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 224 of the first SoC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SoC 202, 204 may communicate via interconnection/bus module 250. In some embodiments, the interconnection/bus module may be a connection established by transceiving (i.e., receiving and transmitting) components within both the SoC 202 and SoC 204. For example, the low power processor 252 may include a universal asynchronous receiver-transmitter (UART) and the application processor 216 may include a multiple signal messages (MSM) UART driver that is communicatively connected to the UART of the low power processor 252.

The various processors 210, 212, 214, 216, 218, may be interconnected to one or more memory elements 220, system components and resources 224, and custom circuitry 222, and a thermal management unit 232 via an interconnection/bus module 226. Similarly, the low power processor 252 may be interconnected to the power management unit 254, the BT controller 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 202, 204 may further include an input/output module (not illustrated) for communicating with resources external to the SoC, such as a clock 206, a voltage regulator 208, one or more wireless transceivers 266, and at least one SIM 268 and/or SIM interface (i.e., an interface for receiving one or more SIM cards). Resources external to the SoC (e.g., clock 206, voltage regulator 208) may be shared by two or more of the internal SoC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example computing device 200 discussed above, various embodiments may be implemented in a wide variety of computing systems, which may include a single processor, multiple processors, multicore processors, or any combination thereof.

In some embodiments, the various processors of the SoC 202 and SoC 204 may be located within a same SoC. For example, the application processor 216 and low power processor 252 may be located within a same SoC, such as in a single SoC of a wearable device, to perform L2P table synchronization functions.

Figure 3:
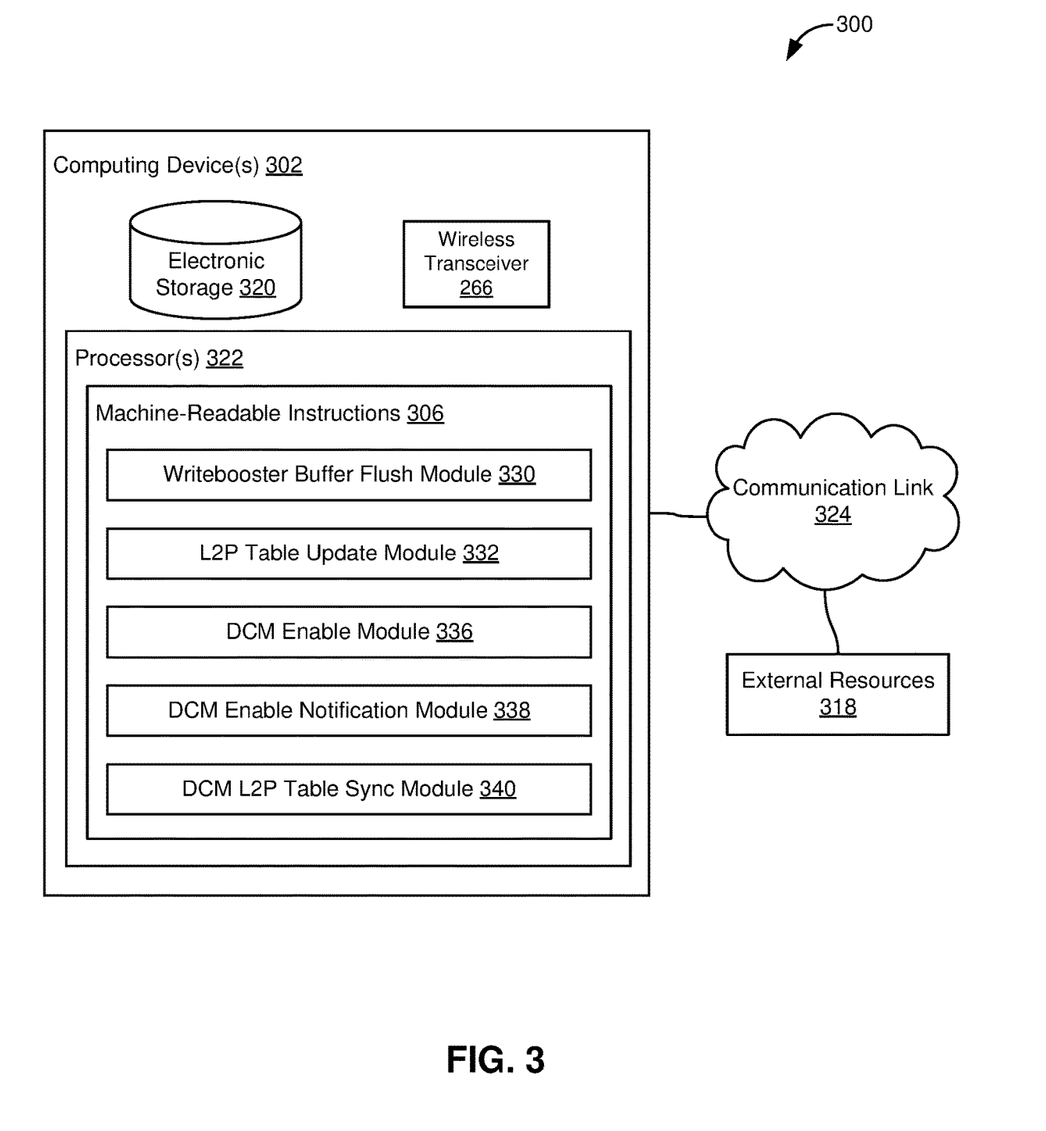
FIG. 3 is a component block diagram illustrating an example system configured for universal flash storage (UFS) read throughput enhancements according to some embodiments.

FIG. 3 is a component block diagram illustrating an example system 300 configured for UFS read throughput enhancements according to some embodiments. With reference to FIGS. 1-3, the system 300 may include one or more computing device(s) 302 (e.g., system 100, computing device 200) and external resources 318, which may communicate via a communication link 324 (e.g., link 114). External resources 318 may include sources of information outside of the system 300, external entities participating with the system 300, or other resources. For example, external resources 318 may be a computing device that may transmit read requests to the computing device(s) 302. In some implementations, some or all of the functionality attributed herein to external resources 318 may be provided by resources included in the system 300. The system 300 may include a plurality of hardware, software, and/or firmware components operating together to provide the functionality attributed herein to the processor 322 (e.g., UFS device controller 116).

The computing device(s) 302 may include electronic storage 320 (e.g., UFS device 106, 272) that may be configured to store information related to functions implemented by a writebooster buffer flush module 330, an L2P address mapping table update module 332, a DCM enable module 336, a DCM enable notification module 338, a DCM L2P address mapping table sync module 340, and any other instruction modules.

The electronic storage 320 may include non-transitory storage media that electronically stores information. The electronic storage 320 may include one or both of system storage that is provided integrally (i.e., substantially non-removable) with the system 300 and/or removable storage that is removably connectable to the system 300 via, for example, a port (e.g., a universal serial bus (USB) port, a firewire port, etc.) or a drive (e.g., a disk drive, etc.).

In various embodiments, electronic storage 320 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The electronic storage 320 may include one or more virtual storage resources (e.g., cloud storage, a virtual private network, and/or other virtual storage resources). The electronic storage 320 may store software algorithms, information determined by processor(s) 322, and/or other information that enables the system 300 to function as described herein. The electronic storage 320 may store one or more L2P address mapping table (e.g., L2P-1, L2P-2).

The computing device(s) 302 may be configured by machine-readable instructions 306. Machine-readable instructions 306 may include one or more instruction modules. The instruction modules may include computer program modules. The instruction modules may include one or more of the writebooster buffer flush module 330, the L2P address mapping table update module 332, the DCM enable module 336, the DCM enable notification module 338, the DCM L2P address mapping table sync module 340, and other instruction modules (not illustrated). The computing device(s) 302 may include processor(s) 322 configured to implement the machine-readable instructions 306 and corresponding modules.

The processor(s) 322 may include one of more local processors that may be configured to provide information processing capabilities in the system 300. As such, the processor(s) 322 may include one or more of a digital processor, an analog processor, a digital circuit designed to process information, an analog circuit designed to process information, a state machine, and/or other mechanisms for electronically processing information. Although the processor(s) 322 is shown in FIG. 3 as a single entity, this is for illustrative purposes only. In some embodiments, the processor(s) 322 may include a plurality of processing units. These processing units may be physically located within the same device, or the processor(s) 322 may represent processing functionality of a plurality of devices distributed in the system 300.

In some embodiments, the processor(s) 322 executing the writebooster buffer flush module 330 may be configured to control implementing a flush of contents of a writebooster buffer (e.g., writebooster buffer 118, SLC NAND memory) of a UFS device (e.g., UFS device 106) to a normal storage (e.g., normal storage 112, TLC NAND memory) of the UFS device. The flush may be implemented periodically, episodically, etc. For example, the flush may be implemented one or more times per read transaction, such as per data out UPIU received at the UFS device. As another example, the flush may be implemented at reaching a capacity threshold for the write booster.

In some embodiments, the processor(s) 322 executing the L2P address mapping table update module 332 may update the L2P address mapping table (L2P-2) at the UFS device following execution of a flush of contents of the writebooster buffer to the normal storage. The update may write addresses for the data stored at the normal storage to the L2P address mapping table at the UFS device. For example, the update may write addresses to the L2P address mapping table of the normal storage for the data flushed from the write booster.

In some embodiments, the processor(s) 322 executing the DCM enable module 336 may be configured to enable DCM of HPB at the UFS device following execution of a flush of contents of the writebooster buffer to the normal storage. The computing device 302 may include an HPB control register (not shown separately), such as at the processor(s) 322 and/or the electronic storage 320, that is configured to store a setting of one or more HPB modes, including DCM. Enabling DCM of HPB may include setting the HPB control register to a value configured to indicate that DCM is enabled. The processor(s) 322 may access the HPB control register and interpret the value to indicate that DCM is enabled.

In some embodiments, the processor(s) 322 executing the DCM enable notification module 338 may be configured to generate and send signals to a host device (e.g., host device 104, SoC 202) configured to indicate to the host device changes in HPB modes. The signals may include response UPIUs to write transactions from the host device. Generating the signals may include setting an indicator of the response UPIUs configured to indicate to the host device changes in HPB modes. For example, the change in the HPB modes may include enabling DCM of HPB at the UFS device.

In some embodiments, the processor(s) 322 executing the DCM L2P address mapping table sync module 340 may be configured to perform DCM initiated L2P address mapping table synchronization of an L2P address mapping table at the host device with the L2P address mapping table at the UFS device. L2P address mapping table synchronization may include sending data of the L2P address mapping table at the UFS device to the host device. For example, the data of the L2P address mapping table at the UFS device may include associated logical and physical addresses at the normal storage for data stored at the normal storage. As another example, the data of the L2P address mapping table at the UFS device may include changes at the L2P address mapping table at the UFS device following execution of a flush of contents of the writebooster buffer to the normal storage.

The description of the functionality provided by the different modules 330-340 is for illustrative purposes, and is not intended to be limiting, as any of modules 330-340 may provide more or less functionality than is described. For example, one or more of modules 330-340 may be eliminated, and some or all of its functionality may be provided by other ones of modules 330-340. As another example, processor(s) 322 may execute one or more additional modules that may perform some or all of the functionality attributed below to one of modules 330-340.

In some embodiments, the writebooster buffer flush module 330, the L2P address mapping table update module 332, the DCM enable module 336, the DCM enable notification module 338, and the DCM L2P address mapping table sync module 340 may be implemented by a UFS device controller (e.g., device controller 116) of the computing device(s) 302, which may be and/or may include processor 322.

Figure 4:
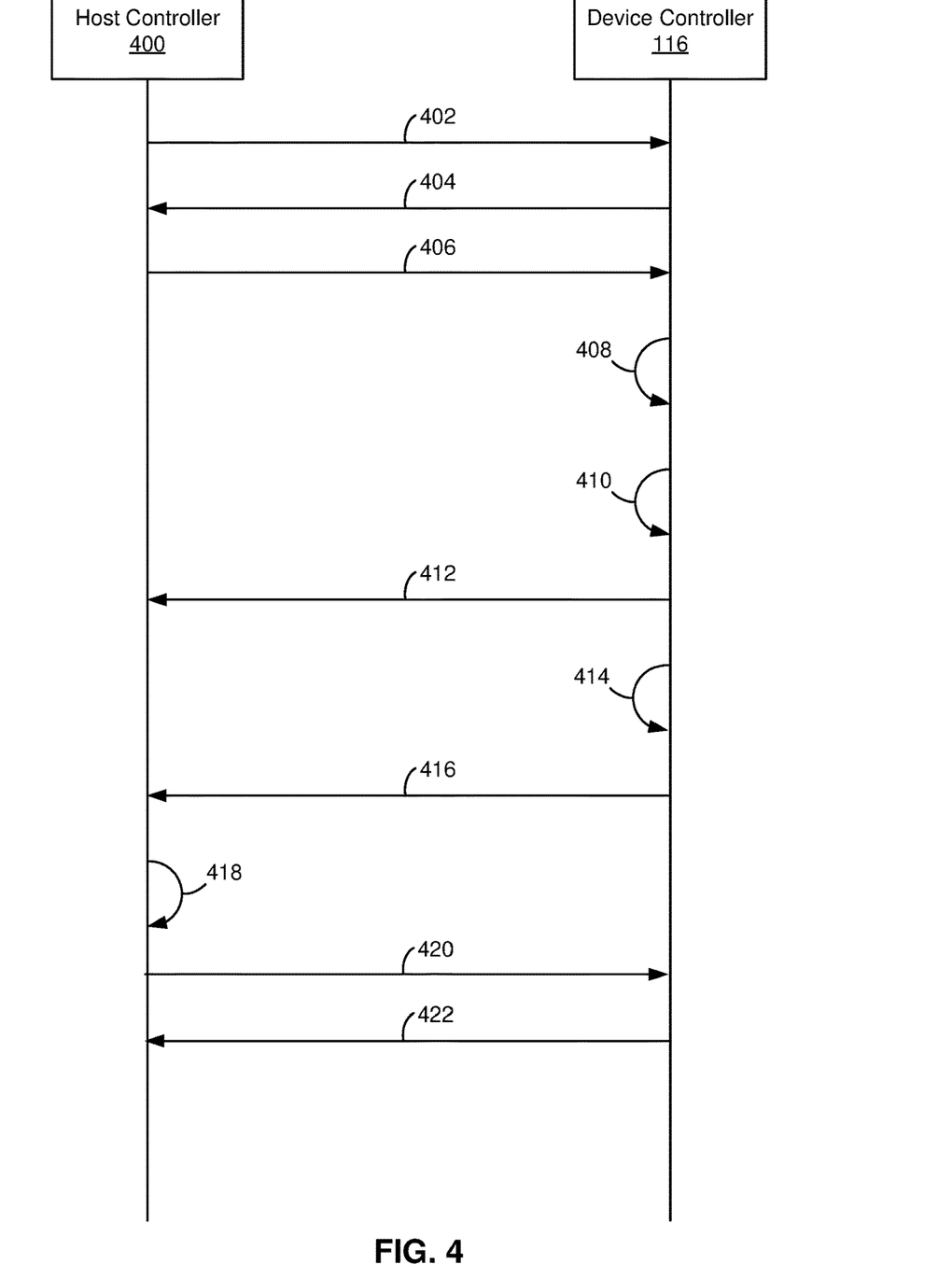
FIG. 4 is a component block and signaling diagram illustrating an example of UFS read throughput enhancements according to some embodiments.

FIG. 4 is a component block and signaling diagram illustrating an example of UFS read throughput enhancements according to some embodiments. With reference to FIGS. 1-4, a host controller 400 (e.g., host controller 104, 262) of an SoC (e.g., SoC 102, 202) may be communicably connected to a device controller 116 of a UFS device (e.g., UFS device 106, 272, processor 322) via a link (e.g., link 114). The host controller 400 and the device controller 116 may each be configured to execute computer code to implement computing operations. The host controller 400 and the device controller 116 may each be configured to send and receive signals, which may include computing data and/or computing instructions, between components of a computing device (e.g., system 100, computing device 200, 302), including between each other, via the link.

The host controller 400 may send a write command to be implemented at the UFS device in operation 402. The device controller 116 may respond to receiving the write command with a ready to transfer signal in operation 404. The host controller 400 may send one or more data out UPIUs, including data and/or addresses at a writebooster buffer (e.g., writebooster buffer 118, SLC NAND memory) in operation 406. In some examples, the host controller 400 may update an L2P address mapping table (L2P-1) at the host device to associate logical addresses for the data of the write command with physical addresses of the writebooster buffer at which to store the data.

The device controller 116 may write the data at the addresses of the writebooster buffer in operation 408 received as a part of the data out UPIUs. In some examples, the device controller 116 may update an L2P address mapping table (L2P-2) at the UFS device to associate logical addresses for the data of the write command with physical addresses of the writebooster buffer at which the data is stored.

The device controller 116 may flush contents of the writebooster buffer to a normal storage (e.g., normal storage 112, TLC NAND memory) in operation 410. The flush may be implemented periodically, episodically, etc. For example, the flush may be implemented one or more times per read transaction, such as per data out UPIU received at the UFS device. As another example, the flush may be implemented at reaching a capacity threshold for the write booster. In some examples, the device controller 116 may update the L2P address mapping table (L2P-2) at the UFS device to associate logical addresses for the data of the write command with physical addresses of the normal storage at which the data is stored following the flush.

The device controller 116 may generate and send a response signal to the write command in operation 412. The response signal may be generated and sent following execution of the flush of contents of the writebooster buffer to the normal storage in operation 410. The response signal may be configured to indicate to the host controller 400 a change in HPB modes at the UFS device. The response signal may include a response UPIU to the write command. Generating the signals may include setting an indicator of the response UPIUs configured to indicate to the host controller 400 changes in HPB modes at the UFS device. For example, the change in the HPB modes may include enabling DCM of HPB at the UFS device.

The device controller 116 may enable DCM of HPB at the UFS device in operation 414. Enabling DCM of HPB at the UFS device may follow execution of the flush of contents of the writebooster buffer to the normal storage in operation 410. The UFS device, including the device controller 116, may include an HPB control register (not shown separately) that is configured to store a setting of one or more HPB modes, including DCM. Enabling DCM of HPB may include setting the HPB control register to a value configured to indicate that DCM is enabled. The device controller 116 may access the HPB control register and interpret the value to indicate that DCM is enabled.

The device controller 116 may generate and send data of the L2P address mapping table (L2P-2) at the UFS device to the host controller 400 in operation 416. For example, the data of the L2P address mapping table (L2P-2) at the UFS device may include associated logical and physical addresses at the normal storage for data stored at the normal storage. As another example, the data of the L2P address mapping table (L2P-2) at the UFS device may include changes at the L2P address mapping table (L2P-2) at the UFS device following execution of a flush of contents of the writebooster buffer to the normal storage. Generating and sending the data of the L2P address mapping table (L2P-2) at the UFS device to the host controller 400 may be part of DCM initiated L2P address mapping table synchronization of the L2P address mapping table (L2P-1) at the host device with the L2P address mapping table (L2P-2) at the UFS device.

The host controller 400 may update the L2P address mapping table (L2P-1) at the host device in operation 418. The host controller 400 may use the data of the L2P address mapping table (L2P-2) at the UFS device received from the device controller 116. For example, the host controller 400 may write the associated logical and/or physical addresses at the normal storage for data stored at the normal storage to the L2P address mapping table (L2P-1) at the host device. As another example, the host controller 400 may update entries and/or add entries at the L2P address mapping table (L2P-1) at the host device that differ from the associated logical and physical addresses at the normal storage for data stored at the normal storage.

The host controller 400 may send a read command for the data of the write command at the UFS device in operation 420. The host controller 400 may translate logical addresses for the read command to physical addresses at the normal storage using the L2P address mapping table (L2P-1) at the host device. The association of the logical addresses for the read command and the physical addresses at the normal storage being located in the L2P address mapping table (L2P-1) at the host device results in a cache hit enabling the translation. The host device may send the read command with the physical addresses at the normal storage. The cache hit avoids a cache miss and the costs of a cache miss resulting from additional look ups in the L2P address mapping table (L2P-2) at the UFS device. The device controller 116 may retrieve the read data using the physical addresses at the normal storage from the read request and return the read date to the host controller in operation 422.

Figure 5:
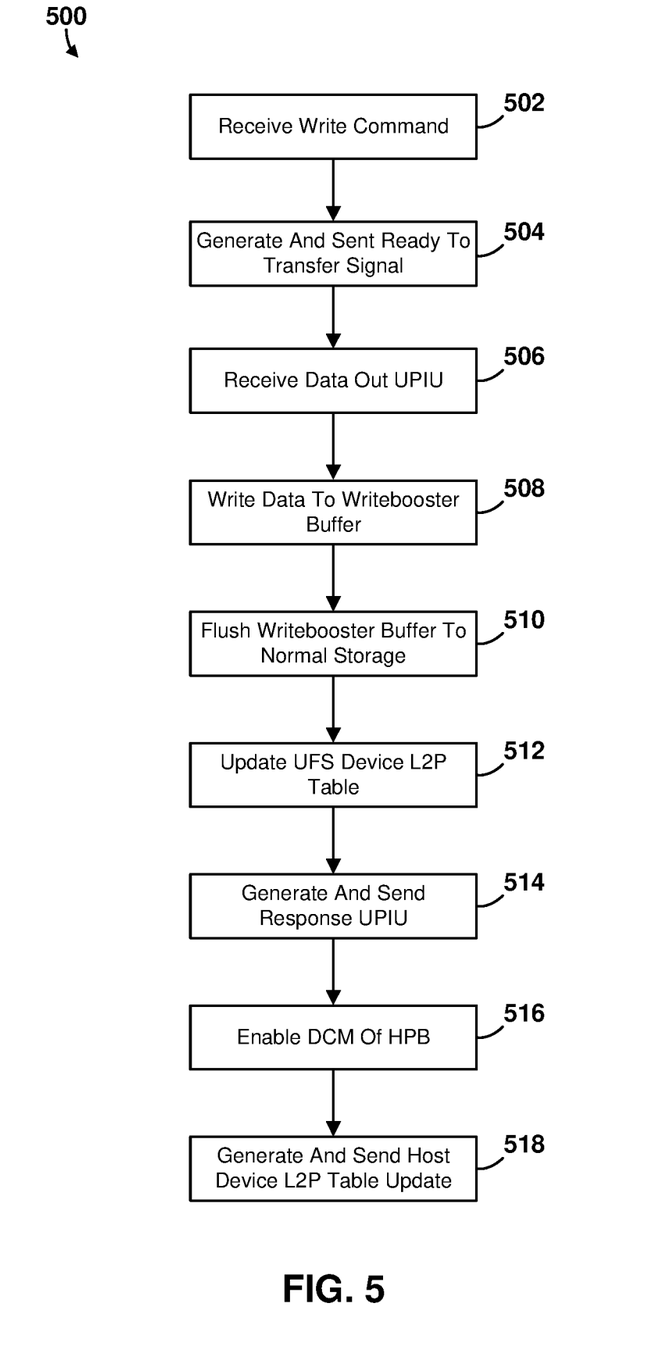
FIG. 5 is a process flow diagram of an example method for UFS read throughput enhancements in accordance with some embodiments.

FIG. 5 is a process flow diagram of an example method 500 that may be performed by a UFS device controller (e.g., by a processor within the UFS device controller) of a computing device for UFS read throughput enhancements in accordance with various embodiments. With reference to FIGS. 1-5, the method 500 may be performed by a UFS device controller (e.g., device controller 116, processor 322) of a computing device (e.g., system 100, computing device 200, 302). In some embodiments, the UFS device controller may include a processor (e.g., processor 322) configured to perform the operations by processor-executable instructions stored in a non-transitory processor-readable medium (e.g., SRAM 118, memory 220, 258, DRAM 270, electronic storage 320). Means for performing the operations of the method 500 may be the UFS device controller, the processor, and/or the like as described with reference to FIGS. 1-5.

In block 502, the UFS device controller may receive a write command. The write command may be received from a host device (e.g., SoC 102, 202, host controller 104, 400). In block 504, the UFS device controller may generate and send a ready to transfer signal to the host device. In block 506, the UFS device controller may receive one or more data out UPIUs from the host device. The data out UPIUs may include write data and physical addresses at a writebooster buffer (e.g., writebooster buffer 118, SLC NAND memory) at which to write the write data for the write command. In block 508, the UFS device controller may write the write data to the writebooster buffer at the physical addresses of the writebooster buffer.

In block 510, the UFS device controller may flush contents of the writebooster buffer to a normal storage (e.g., normal storage 112, electronic storage 320, TLC NAND memory). The flush may be implemented periodically, episodically, etc. For example, the flush may be implemented one or more times per read transaction, such as per data out UPIU received at the UFS device. As another example, the flush may be implemented upon reaching a capacity threshold for the write booster.

In block 512, the UFS device controller may update an L2P address mapping table (L2P-2) at the UFS device. In some examples, the device controller may update the L2P address mapping table (L2P-2) at the UFS device to associate logical addresses for the data of the write command with physical addresses of the normal storage at which the data is stored following the flush.

In block 514, the UFS device controller may generate and send a response signal to the write command. The response signal may be generated and sent following execution of the flush of contents of the writebooster buffer to the normal storage. The response signal may be configured to indicate to the host device a change in HPB modes at the UFS device. The response signal may include a response UPIU to the write command. Generating the signals may include setting an indicator of the response UPIUs configured to indicate to the host device changes in HPB modes at the UFS device. For example, the change in the HPB modes may include enabling DCM of HPB at the UFS device.

In block 516, the UFS device controller may enable DCM of HPB at the UFS device. Enabling DCM of HPB at the UFS device may follow execution of the flush of contents of the writebooster buffer to the normal storage. The UFS device, including the UFS device controller, may include an HPB control register that is configured to store a setting of one or more HPB modes, including DCM. Enabling DCM of HPB may include setting the HPB control register to a value configured to indicate that DCM is enabled. The UFS device controller may access the HPB control register and interpret the value to indicate that DCM is enabled.

In block 518, the UFS device controller may generate and send a host device L2P address mapping table (LP-1) update. The update may include data of the L2P address mapping table (L2P-2) at the UFS device. For example, the data of the L2P address mapping table (L2P-2) at the UFS device may include associated logical and physical addresses at the normal storage for data stored at the normal storage. As another example, the data of the L2P address mapping table (L2P-2) at the UFS device may include changes at the L2P address mapping table (L2P-2) at the UFS device following execution of a flush of contents of the writebooster buffer to the normal storage.

Figure 6:
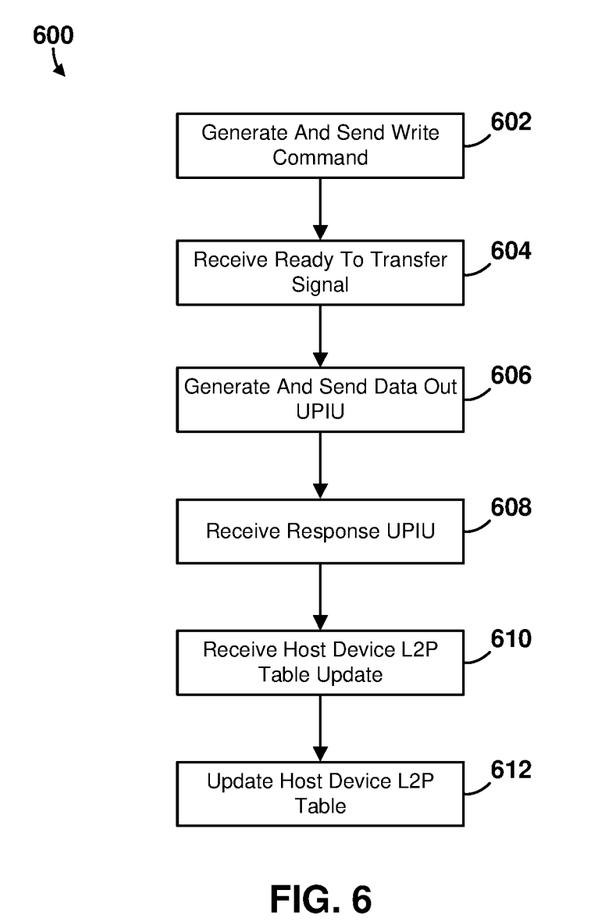
FIG. 6 is a process flow diagram of an example method for UFS read throughput enhancements in accordance with some embodiments.

FIG. 6 is a process flow diagram of an example method 600 that may be performed by a host controller (e.g., by a processor within the host controller) of a computing device for UFS read throughput enhancements in accordance with various embodiments. With reference to FIGS. 1-6, the method 600 may be performed by a host controller (e.g., host controller 104, 262, 400) of a computing device (e.g., system 100, computing device 200). In some embodiments, the host controller may include a processor (e.g., processor 322) configured to perform the operations by processor-executable instructions stored in a non-transitory processor-readable medium (e.g., DRAM 108, 270 memory 220, 258). Means for performing the operations of the method 600 may be the host controller, the processor, and/or the like as described with reference to FIGS. 1-6.

In some embodiments, the method 600 may be implemented in parallel with the method 500 described with reference to FIG. 5. For example, the UFS device controller implementing the method 500 may be the same as a UFS device controller and/or part of the UFS device described in the method 600, and the host controller implementing the method 600 may be the same as the host controller and/or part of the host device described for the method 500.

In block 602, the host controller may generate and send a write command to a UFS device (e.g., UFS device 106, 272, UFS device controller 116, processor 322). In block 604, the host controller may receive a ready to transmit signal from the UFS device. In block 606, the host controller may generate and send one or more data out UPIUs to the UFS device. The data out UPIUs may include write data and physical addresses at a writebooster buffer (e.g., writebooster buffer 118, SLC NAND memory) at which to write the write data for the write command.

In block 608, the host controller may receive a response signal to the write command. The response signal may be generated and sent following execution of a flush of contents of the writebooster buffer to a normal storage (e.g., normal storage 112, TLC NAND memory). The response signal may be configured to indicate to the host controller a change in HPB modes at the UFS device. The response signal may include a response UPIU to the write command. The response UPIUs may include an indicator configured to indicate to the host controller changes in HPB modes at the UFS device. For example, the change in the HPB modes may include enabling DCM of HPB at the UFS device.

In block 610, the host controller may receive a host device L2P address mapping table (LP-1) update. The update may include data of an L2P address mapping table (L2P-2) at the UFS device. For example, the data of the L2P address mapping table (L2P-2) at the UFS device may include associated logical and physical addresses at the normal storage for data stored at the normal storage. As another example, the data of the L2P address mapping table (L2P-2) at the UFS device may include changes at the L2P address mapping table (L2P-2) at the UFS device following execution of a flush of contents of the writebooster buffer to the normal storage.

In block 612, the host controller may update the L2P address mapping table (LP-1) at the host device. The host controller may use the data of the L2P address mapping table (L2P-2) at the UFS device received from the host device L2P address mapping table (LP-1) update. For example, the host controller may write the associated logical and physical addresses at the normal storage for data stored at the normal storage to the L2P address mapping table (L2P-1) at the host device. As another example, the host controller may update entries and/or add entries at the L2P address mapping table (L2P-1) at the host device that differ from the associated logical and physical addresses at the normal storage for data stored at the normal storage.

Figure 7:
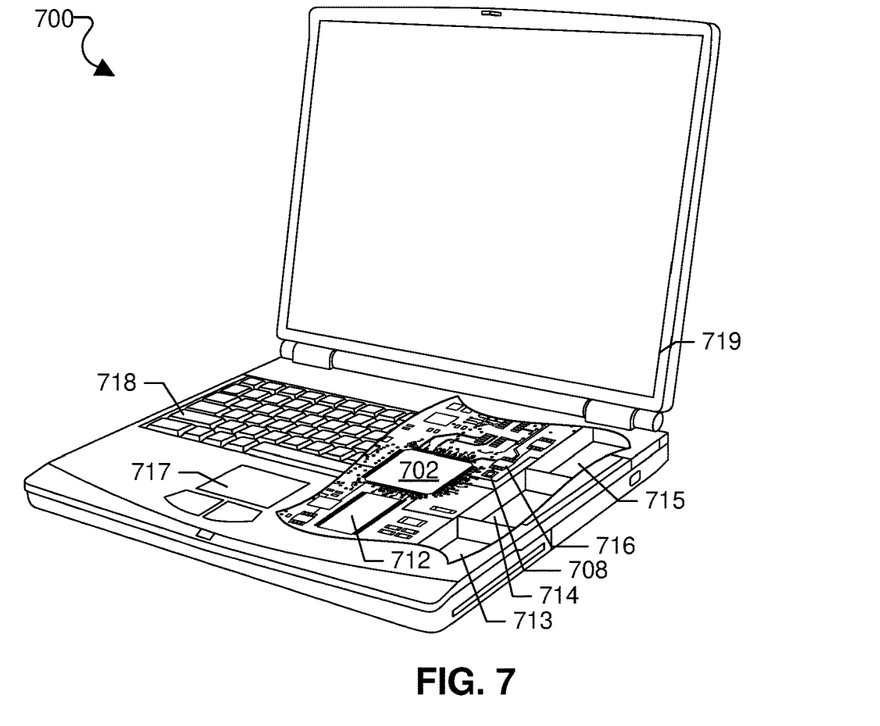
FIG. 7 is a component block diagram illustrating an example computing device suitable for use with the various embodiments.

Various embodiments (including, but not limited to, embodiments described with reference to FIGS. 1-6) may be implemented in a wide variety of computing systems, which may include a laptop computer 700 (e.g., computing device 100, 200, 320), an example of which is illustrated in FIG. 7. With reference to FIGS. 1-7, a laptop computer may include a touchpad touch surface 717 that serves as the computer's pointing device, and thus may receive drag, scroll, and flick gestures similar to those implemented on computing devices equipped with a touch screen display and described above. A laptop computer 700 will typically include a processor 702 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 702. The computer 700 may also include a floppy disc drive 714 and a compact disc (CD) drive 715 coupled to the processor 702. The laptop computer 700 may include a touchpad 717, a keyboard 718, and a display 719 all coupled to the processor 702. Other configurations of the computing device may include a computer mouse or trackball coupled to the processor (e.g., via a USB input) as are well known, which may also be used in conjunction with the various embodiments.

Figure 8:
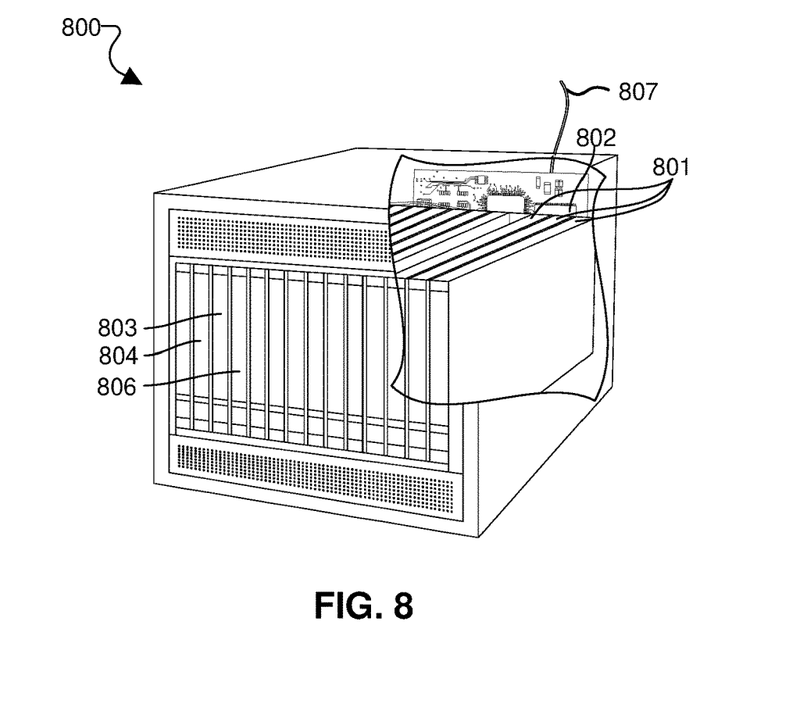
FIG. 8 is a component block diagram illustrating an example server suitable for use with the various embodiments.

FIG. 8 is a component block diagram of a computing device 800, such as a server, suitable for use with various embodiments. Such computing devices may include at least the components illustrated in FIG. 8. With reference to FIGS. 1-8, the computing device 800 (e.g., computing device 100, 200, 320) may include a processor 801 coupled to volatile memory 802 and a large capacity nonvolatile memory, such as a disk drive 803.

The computing device 800 may also include a peripheral memory access device such as a floppy disc drive, compact disc (CD) or digital video disc (DVD) drive 806 coupled to the processor 801. The computing device 800 may also include network access ports 804 (or interfaces) coupled to the processor 801 for establishing data connections with a network, such as the Internet and/or a local area network coupled to other system computers and servers.

The computing device 800 may include one or more antennas 807 for sending and receiving electromagnetic radiation that may be connected to a wireless communication link. The computing device 800 may include additional access ports, such as USB, Firewire, Thunderbolt, and the like for coupling to peripherals, external memory, or other devices.

Figure 9:
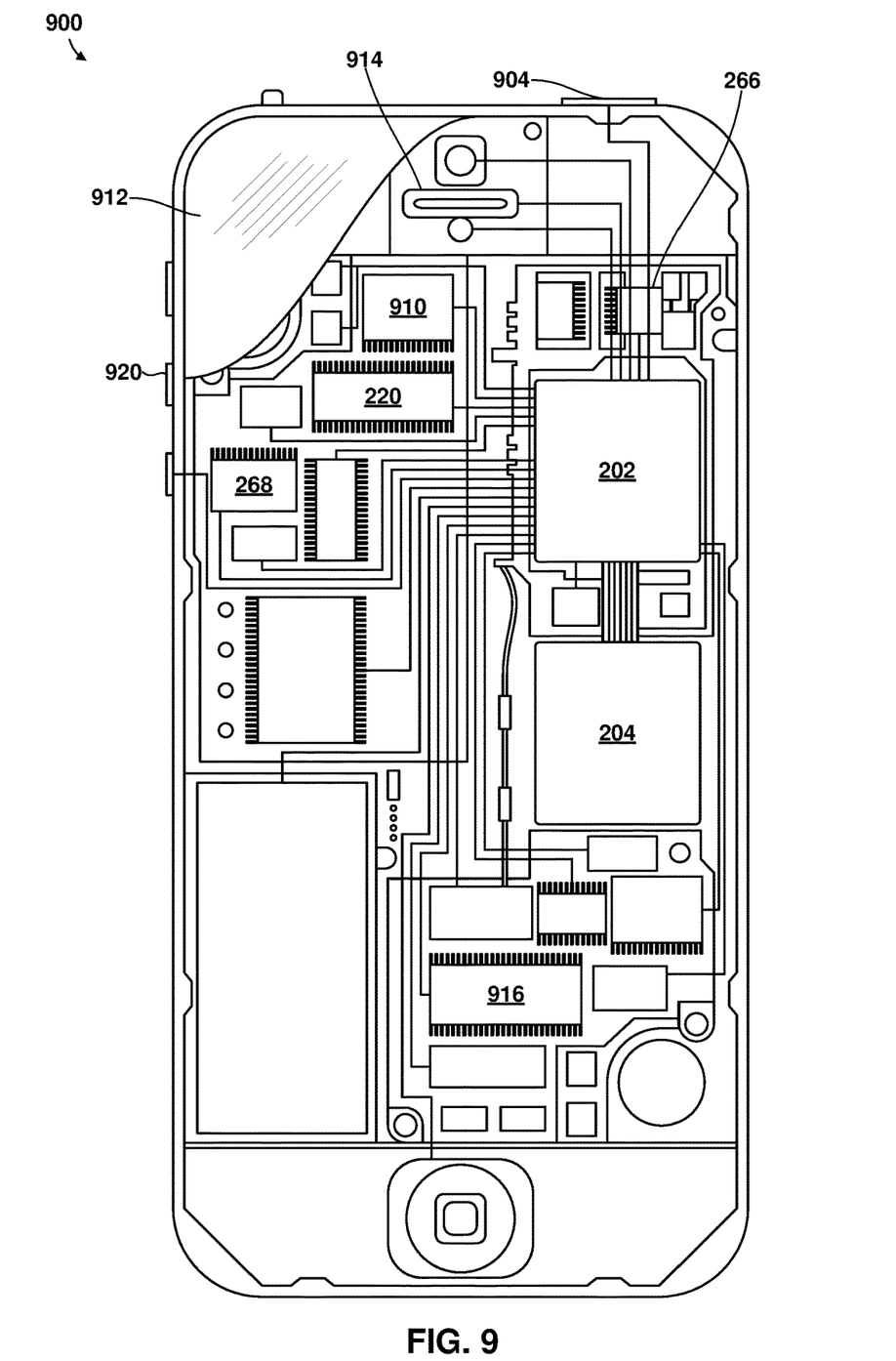
FIG. 9 is a component block diagram illustrating an example wireless communication device suitable for use with the various embodiments.

FIG. 9 is a component block diagram of a computing device 900 suitable for use with various embodiments. With reference to FIGS. 1-9, various embodiments may be implemented on a variety of computing devices 900 (e.g., computing device 100, 200, 320), an example of which is illustrated in FIG. 9 in the form of a smartphone. The computing device 900 may include a first SoC 202 (e.g., a SoC-CPU) coupled to a second SoC 204 (e.g., a 5G capable SoC). The first and second SoCs 202, 204 may be coupled to internal memory 916, a display 912, and to a speaker 914. The first and second SoCs 202, 204 may also be coupled to at least one SIM 268 and/or a SIM interface that may store information supporting a first 5GNR subscription and a second 5GNR subscription, which support service on a 5G non-standalone (NSA) network.

The computing device 900 may include an antenna 904 for sending and receiving electromagnetic radiation that may be connected to a wireless transceiver 266 coupled to one or more processors in the first and/or second SoCs 202, 204. The computing device 900 may also include menu selection buttons or rocker switches 920 for receiving user inputs.

The computing device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 910 may include a digital signal processor (DSP) circuit (not shown separately).

The processors of the computer 700, the computing device 800, and the computing device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in memory 220, 916 before they are accessed and loaded into the processor. The processors may include internal memory sufficient to store the application software instructions.

Implementation examples are described in the following paragraphs. While some of the following implementation examples are described in terms of example methods that may be performed in a computing device by a host controller, further example implementations may include: a computing device including a UFS device controller and a host controller configured to perform the methods of the following implementation examples; a computing device including means for performing functions of the following implementation examples, a UFS device controller and a host controller suitable for use in a computing device, in which the UFS device controller and the host controller each includes a processor configured to perform the methods of the following implementation examples; and a non-transitory, processor-readable memory having stored thereon processor-executable instructions configured to cause a UFS device controller and a host controller in a computing device configured to perform the methods of the following implementation examples.

Example 1. A method performed by a universal flash storage (UFS) system of a computing device for updating logical-to-physical (L2P) address mapping tables, the method including: enabling a device control mode (DCM) of host performance booster (HPB) based on a flush of a writebooster buffer (e.g., SLC memory) to a normal storage (e.g., TLC memory) of a UFS device of the UFS system; and updating an L2P address mapping table at a host device of the UFS system while DCM is enabled based on the flush of the writebooster buffer to the normal storage.

Example 2. The method of example 1, further including: generating a signal configured to indicate a change in an HPB mode at the UFS device based on the flush of the writebooster buffer to the normal storage; and sending the signal from the UFS device to the host device.

Example 3. The method of example 2, in which the signal includes a UFS protocol information unit (UPIU), the method further including setting an indicator of the UPIU configured to indicate the change in the HPB mode at the UFS device based on the flush of the writebooster buffer to the normal storage.

Example 4. The method of any of examples 1-3, in which enabling the DCM of HPB based on the flush of the writebooster buffer to the normal storage of the UFS device of the UFS system includes enabling the DCM by a UFS device controller at the UFS device.

Example 5. The method of example 4, in which enabling the DCM by the UFS device controller at the UFS device includes setting an HPB control register at the UFS device configured to indicate that DCM is enabled.

Example 6. The method of any of examples 1-5, further including sending data of an L2P address mapping table at the UFS device with DCM enabled to the host device, in which updating the L2P address mapping table at the host device of the UFS system while DCM is enabled based on the flush of the writebooster buffer to the normal storage includes updating the L2P address mapping table at the host device using the data of the L2P address mapping table.

Example 7. The method of any of claims 1-6, in which enabling the DCM of HPB based on the flush of the writebooster buffer to the normal storage of the UFS device of the UFS system includes enabling the DCM of HPB proportionally to a writebooster buffer flush rate.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a universal flash storage (UFS) system of a computing device for updating logical-to-physical (L2P) address mapping tables, comprising:
    enabling a device control mode (DCM) of host performance booster (HPB) based on a flush of a writebooster buffer to a normal storage of a UFS device of the UFS system; and
    updating an L2P address mapping table at a host device of the UFS system while the DCM is enabled based on the flush of the writebooster buffer to the normal storage.

2. The method of claim 1, further comprising:
    generating a signal configured to indicate a change in an HPB mode at the UFS device based on the flush of the writebooster buffer to the normal storage; and
    sending the signal from the UFS device to the host device.

3. The method of claim 2, wherein the signal includes a UFS protocol information unit (UPIU), the method further comprising setting an indicator of the UPIU configured to indicate the change in the HPB mode at the UFS device based on the flush of the writebooster buffer to the normal storage.

4. The method of claim 1, wherein enabling the DCM of HPB based on the flush of the writebooster buffer to the normal storage of the UFS device of the UFS system comprises enabling the DCM by a UFS device controller at the UFS device.

5. The method of claim 4, wherein enabling the DCM by the UFS device controller at the UFS device comprises setting an HPB control register at the UFS device configured to indicate that the DCM is enabled.

6. The method of claim 1, further comprising sending data of an L2P address mapping table at the UFS device with DCM enabled to the host device, wherein updating the L2P address mapping table at the host device of the UFS system while DCM is enabled based on the flush of the writebooster buffer to the normal storage comprises updating the L2P address mapping table at the host device using the data of the L2P address mapping table.

7. The method of claim 1, wherein enabling the DCM of HPB based on the flush of the writebooster buffer to the normal storage of the UFS device of the UFS system comprises enabling the DCM of HPB proportionally to a writebooster buffer flush rate.

8. A universal flash storage (UFS) system, comprising:
a host device;
a UFS device communicably connected to the host device;
a UFS device controller of the UFS device configured to enable a device control mode (DCM) of host performance booster (HPB) based on a flush of a writebooster buffer to a normal storage of the UFS device; and
a host controller of the UFS device configured to update a logical-to-physical (L2P) address mapping table at the host device while DCM is enabled based on the flush of the writebooster buffer to the normal storage.

9. The UFS system of claim 8, wherein the UFS device controller is further configured to:
generate a signal configured to indicate a change in an HPB mode at the UFS device based on the flush of the writebooster buffer to the normal storage; and
send the signal from the UFS device to the host device.

10. The UFS system of claim 9, wherein:
the signal includes a UFS protocol information unit (UPIU); and
the UFS device controller is further configured to set an indicator of the UPIU configured to indicate the change in the HPB mode at the UFS device based on the flush of the writebooster buffer to the normal storage.

11. The UFS system of claim 8, wherein the UFS device controller is further configured to set an HPB control register at the UFS device configured to indicate that DCM is enabled.

12. The UFS system of claim 8, wherein:
the UFS device controller is further configured to send data of an L2P address mapping table at the UFS device with DCM enabled to the host device; and
the host controller is further configured to update the L2P address mapping table at the host device using the data of the L2P address mapping table.

13. The UFS system of claim 8, wherein the UFS device controller is further configured to enable the DCM of HPB proportionally to a writebooster buffer flush rate.

14. A computing device, comprising:
means for enabling a device control mode (DCM) of host performance booster (HPB) based on a flush of a writebooster buffer to a normal storage of a universal flash storage (UFS) device of a UFS system; and
means for updating a logical-to-physical (L2P) address mapping table at a host device of the UFS system while DCM is enabled based on the flush of the writebooster buffer to the normal storage.

15. The computing device of claim 14, further comprising:
means for generating a signal configured to indicate a change in an HPB mode at the UFS device based on the flush of the writebooster buffer to the normal storage; and
means for sending the signal from the UFS device to the host device.

16. The computing device of claim 15, wherein the signal includes a UFS protocol information unit (UPIU), the computing device further comprising means for setting an indicator of the UPIU configured to indicate the change in the HPB mode at the UFS device based on the flush of the writebooster buffer to the normal storage.

17. The computing device of claim 14, wherein means for enabling the DCM at the UFS device comprises means for setting an HPB control register at the UFS device configured to indicate that DCM is enabled.

18. The computing device of claim 14, further comprising means for sending data of an L2P address mapping table at the UFS device with DCM enabled to the host device,
wherein means for updating the L2P address mapping table at the host device of the UFS system while DCM is enabled based on the flush of the writebooster buffer to the normal storage comprises means for updating the L2P address mapping table at the host device using data of the L2P address mapping table.

19. The computing device of claim 14, wherein means for enabling the DCM of HPB based on the flush of the writebooster buffer to the normal storage of the UFS device of the UFS system comprises means for enabling the DCM of HPB proportionally to a writebooster buffer flush rate.

20. A non-transitory processor-readable medium having stored thereon:
processor executable instructions configured to cause a UFS device controller of a UFS system to perform operations comprising enabling a device control mode (DCM) of host performance booster (HPB) based on a flush of a writebooster buffer to a normal storage of a universal flash storage (UFS) device of the UFS system; and
processor executable instructions configured to cause a host controller of the UFS system to perform operations comprising updating a logical-to-physical (L2P) address mapping table at a host device of the UFS system while DCM is enabled based on the flush of the writebooster buffer to the normal storage.

21. The non-transitory processor-readable medium of claim 20, wherein the stored processor-executable instructions are configured to cause the UFS device controller to perform operations further comprising:
generating a signal configured to indicate a change in an HPB mode at the UFS device based on the flush of the writebooster buffer to the normal storage; and
sending the signal from the UFS device to the host device.

22. The non-transitory processor-readable medium of claim 21, wherein:
the signal includes a UFS protocol information unit (UPIU); and
the stored processor-executable instructions are configured to cause the UFS device controller to perform operations further comprising setting an indicator of the UPIU configured to indicate the change in the HPB mode at the UFS device based on the flush of the writebooster buffer to the normal storage.

23. The non-transitory processor-readable medium of claim 20, wherein the stored processor-executable instructions are configured to cause the UFS device controller to perform operations such that enabling the DCM by the UFS device controller at the UFS device comprises setting an HPB control register at the UFS device configured to indicate that DCM is enabled.

24. The non-transitory processor-readable medium of claim 20, wherein:

the stored processor-executable instructions are configured to cause the UFS device controller to perform operations further comprising sending data of an L2P address mapping table at the UFS device with DCM enabled to the host device; and the stored processor-executable instructions are configured to cause the host controller to perform operations such that updating the L2P address mapping table at the host device of the UFS system while DCM is enabled based on the flush of the writebooster buffer to the normal storage comprises updating the L2P address mapping table at the host device using the data of the L2P address mapping table.

25. The non-transitory processor-readable medium of claim 20, wherein the stored processor-executable instructions are configured to cause the UFS device controller to perform operations such that enabling the DCM of HPB based on the flush of the writebooster buffer to the normal storage of the UFS device of the UFS system comprises enabling the DCM of HPB proportionally to a writebooster buffer flush rate.

* * * * *